Nov. 17, 1931.  G. T. CHURCH  1,832,532
ELECTRICAL HEATING APPARATUS PARTICULARLY FOR USE WITH INCUBATORS
Filed March 27, 1929   2 Sheets-Sheet 1
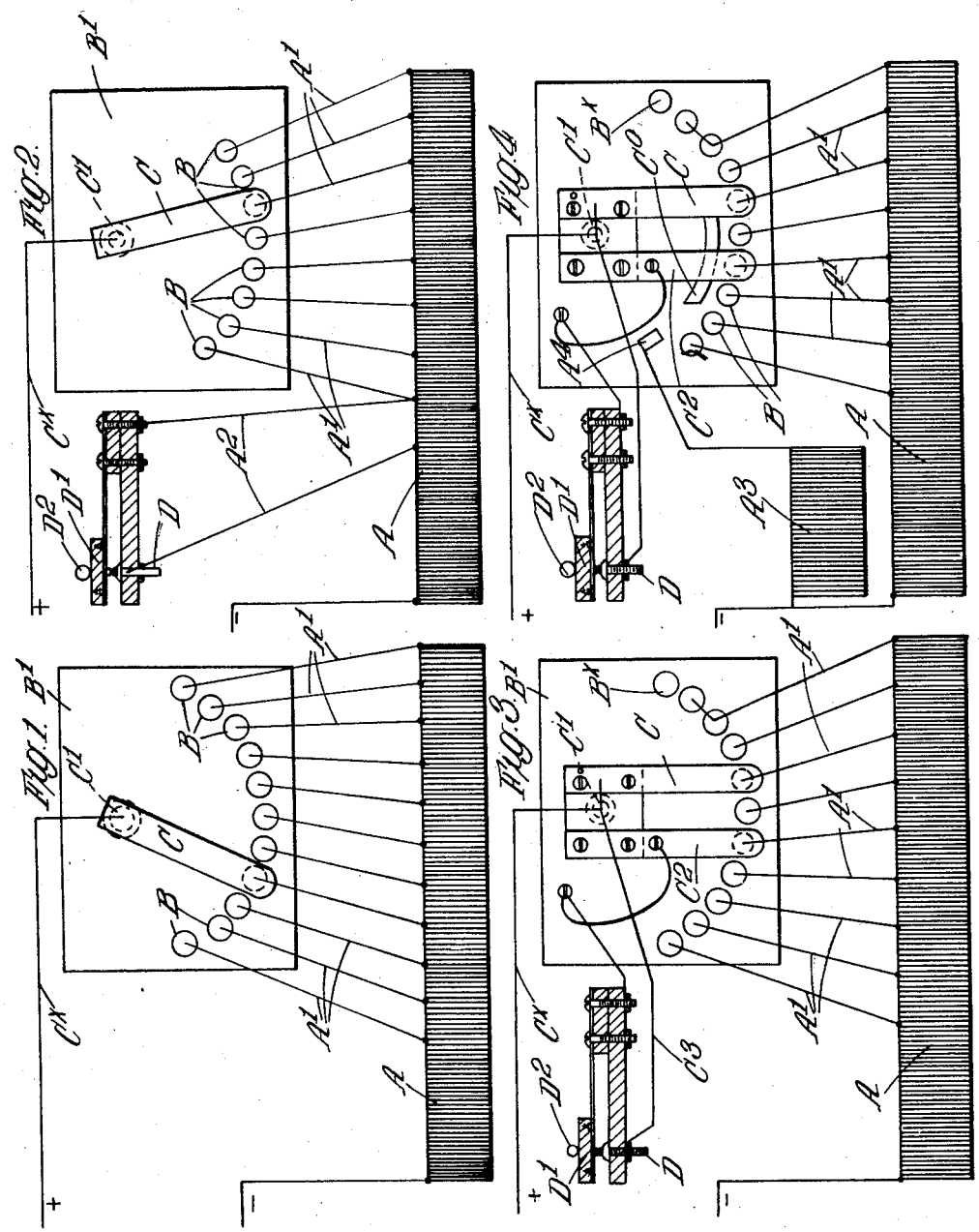

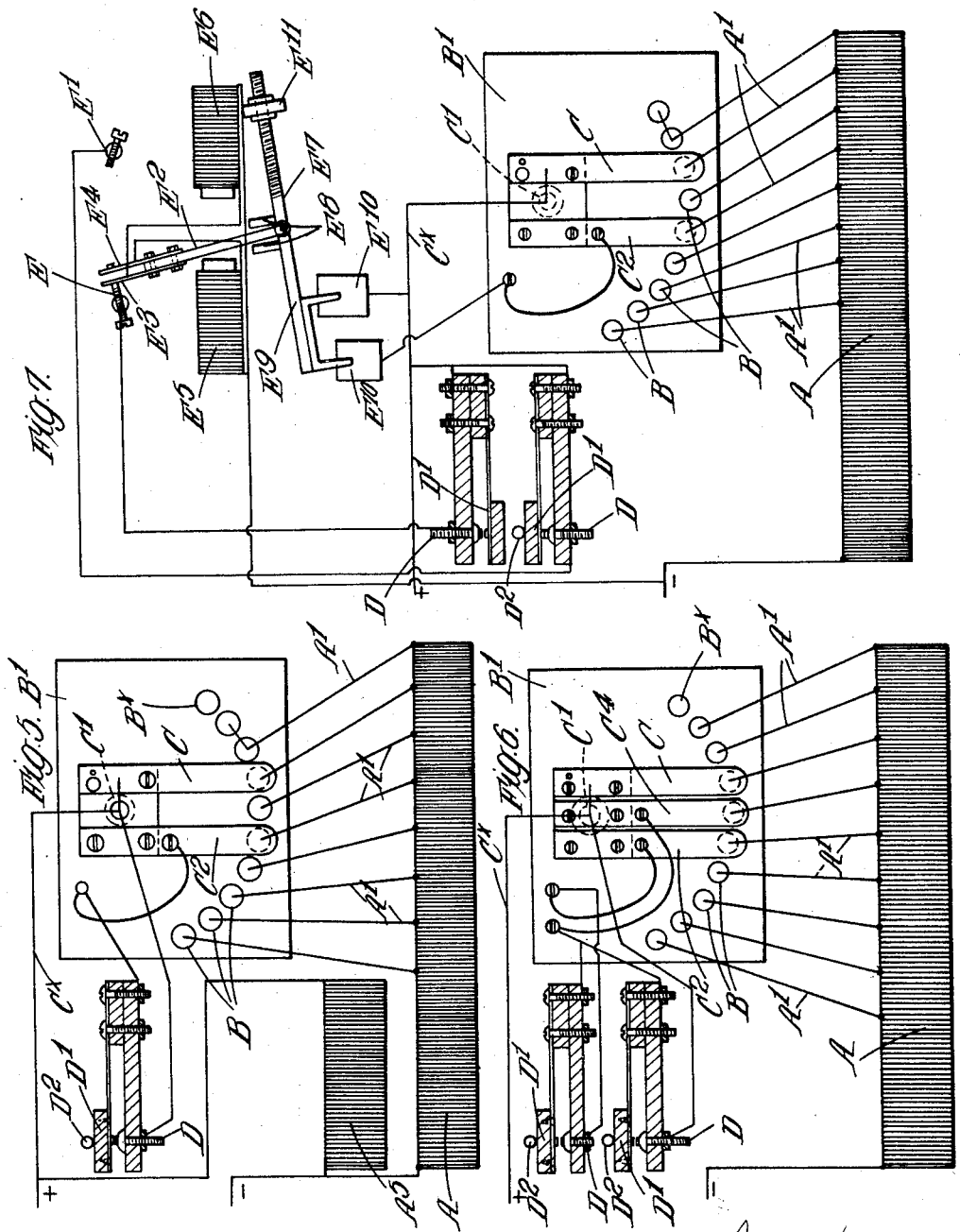

Patented Nov. 17, 1931

1,832,532

UNITED STATES PATENT OFFICE

GEORGE THOMAS CHURCH, OF CHERTSEY, ENGLAND

ELECTRICAL HEATING APPARATUS PARTICULARLY FOR USE WITH INCUBATORS

Application filed March 27, 1929, Serial No. 350,420, and in Great Britain June 6, 1928.

This invention relates to electrical heating apparatus, particularly intended for use with incubators or other chambers the temperature of which is required to be kept approximately constant.

According to the invention a resistance serving as the heating element is tapped at different points which are connected by leads to contact studs or the like co-operating with a switch arm connected to one of the poles of the electric supply so that by moving the switch arm more or less of the resistance can be brought into the circuit to vary as required the temperature of the chamber in which the resistance is situated or with which it is associated, it being understood that the zero end of the resistance is connected to the other pole of the electric supply. The invention thus differs from those forms of electrical heating apparatus in which the control is effected by a rheostat arranged in series with the resistance forming the heating element.

When the heating apparatus is used in conjunction with an incubator or other chamber the temperature of which is required to be kept automatically at a substantially constant level, I may provide means for automatically varying the amount of resistance in circuit in accordance with the temperature of the said chamber. The said means may be associated with a single switch arm but alternatively I may provide a second switch arm which bears on a contact stud appertaining to a resistance tapping below the one connected to the contact stud on which the first switch arm is for the time being resting and I provide a make and break device for automatically connecting this second switch arm to the pole to which the other switch arm is connected, when the temperature falls below a certain level and for breaking the connection when the temperature rises above another level, the temperature being thus maintained between the said levels which may differ by only a few degrees. The said make and break device may comprise a contact piece and a spring contact member operated by a rod or other member under the influence of the usual capsule or other temperature controlled element, the contact piece being electrically connected to one of the aforesaid switch arms and the contact member being electrically connected to the other switch arm. The second switch arm is electrically insulated from the first switch arm but these arms are mechanically connected together so that the second arm bears against a contact stud having a lower resistance value than that of the stud on which the first arm bears. The connected switch arms are first moved over the contact studs until the temperature is slightly lower than that which is required. The rod operated by the capsule or other device is then adjusted until the contact member comes against its contact piece, and the apparatus will then automatically vary the amount of the resistance in circuit to keep the temperature within the required limits.

It may happen that when only a few degrees difference of temperature exists between the incubator or other chamber and the atmosphere of the room in which the said chamber is situated, the position of the first switch arm on the contact stud appertaining to the highest value of the resistance will provide too high a temperature and to prevent this I provide an additional "no current" or dummy contact stud on to which the first switch arm can be moved, the second switch arm then resting on the said contact stud appertaining to the highest value of the resistance; the temperature inside the chamber is thus maintained between that given by the highest value of the resistance and that of the atmosphere of the room in which the said chamber is situated.

In order that the said invention may be more clearly understood and readily carried into effect, the same will now be described with reference to the accompanying drawings in which:—

Figures 1 to 7 are views showing more or less diagrammatically several forms of electrical heating apparatus according to my invention.

In all the forms of electrical heating apparatus shown by the drawings, A is the tapped resistance which serves as the heating element and one end of which is connected to one of the poles (the negative for example) of a source of electric supply. The tapping points of the said resistance are connected by leads A', A'—to contact studs B, B—carried by an insulating plate B' which may conveniently be arranged in a box. Co-operating with these studs is a selecting switch arm C which is electrically connected by a lead $C^x$ to the other pole of the source of electric supply.

The simplest form of the invention is shown in Figure 1 and in this form the switch arm C is moved about a pivot C' (preferably by means of a knob arranged outside the box containing the plate B') to cause the said arm to rest on any one of the said studs, the selected stud being that which will give approximately the required temperature, it being understood that the stud on the left hand side of Figure 1 gives the highest temperature and the stud on the right hand side the lowest temperature.

Figure 2 shows a form of the invention for use in conjunction with an incubator or other chamber the temperature of which is required to be kept at a substantially constant level and in this form a section of the resistance A is connected by leads $A^2$, $A^2$ to a contact point D and to a spring make and break contact member D' which is operated by a rod $D^2$ under the influence of the usual capsule of the incubator, the arrangement being such that when the rod $D^2$ moves downwards on decrease of temperature the member D' makes contact with the point D and thereby short-circuits the said section of the resistance to increase the temperature; when the temperature rises the rod $D^2$ rises and the member D' moves away from the piece D, thereby bringing the said section into circuit and reducing the temperature.

In Figure 3 there is provided a second switch arm $C^2$ which bears on a contact stud B appertaining to a resistance tapping below the one connected to the stud on which the switch arm C is resting at any time. This second switch arm is mechanically connected to the switch arm C but is electrically insulated from it and from the pivot C' which is in electrical connection with the switch arm C. The second switch arm $C^2$ is electrically connected to the aforesaid spring contact member D' operated by the rod $D^2$ and the arm C, which is connected by the lead $C^{76}$ to the positive pole, is also connected by a lead $C^3$ to the contact piece D. In this manner the rise of the rod $D^2$ will bring into operation the portion of the resistance A between the arms C and $C^2$ and the fall of this rod will short-circuit the said portion. To prepare the apparatus for working the connected switch arms C, $C^2$ are first moved over the studs B until the temperature of the chamber is slightly below that which is required and the rod $D^2$ is then adjusted until the member D' bears on the piece D. Variations of temperature then vary the amount of resistance in circuit as aforesaid and the temperature of the chamber is thus maintained within the required limits. The switch arms C, $C^2$ are shown as being two contact studs apart but if desired they may be only one apart or more than two; either or both of the said switch arms may be made adjustable so that their distance apart can be altered as required. This figure also shows at $B^x$ the aforesaid "no current" or dummy contact stud on which the switch arm C can be moved, the switch arm $C^2$ then resting on the stud appertaining to the highest value of the resistance.

Figure 4 is similar to Figure 3 except for the provision of an extra heating resistance $A^3$ one end of which is connected to the negative pole and the other to a knife contact $A^4$ with which an extension $C^0$ on the switch arm C engages when the connected switch arms are moved to the maximum temperature position. The purpose of this resistance $A^3$ is to provide additional heat for quickly heating a cold chamber to approximately the required temperature. This extra heating resistance may also be provided in the apparatus according to Figures 1, 2, 6 and 7.

Figure 5 is also similar to Figure 3 except for the provision of an extra heating resistance $A^5$ which is always in circuit when the apparatus is in operation and constitutes the main heating element. This extra resistance may also be provided in the apparatus according to Figures 1, 2, 6 and 7.

Figure 6 shows a form of the invention similar to Figure 3 suitable for large heating apparatus and in this form there are two make and break contact devices D, D' the spring contact member of the additional device being electrically connected to an extra switch arm $C^4$ situated between the aforesaid switch arms C, $C^2$. This switch arm $C^4$ is mechanically connected to the others but is electrically insulated from them. The two spring contact members D' may be operated by separate capsule rods as shown or by the same capsule rods if the said members are arranged in the same plane so that the said rod can rest on both of them.

Figure 7 shows another form suitable for a large heating apparatus in which, in order to reduce sparking at the make and break contact device D, D' of Figure 3, a relay is provided. In this construction there are two make and break contact devices with the capsule rod D² situated between the members D', D' as shown. One of the contact pieces D is connected to a contact piece E and the other to a contact piece E' whilst the members D', D' are connected to the positive pole. The pieces E, E' are arranged one on each side of a pivoted iron member or armature E² having two insulated contact blades E³, E⁴ of which the blade E⁴ is electrically connected to one end of the coil of an electromagnet E⁵ and the blade E³ is electrically connected to one end of the coil of an electromagnet E⁶, the other ends of these coils being connected to the negative pole of the supply. Loosely pivoted on the pivot of the armature E² is a lever E⁷ having projections E⁸, E⁸ between which the armature E² is free to move with a certain amount of lost motion. This lever has at one end an insulated bridge-piece E⁹ provided with points for dipping into mercury contained in cups E¹⁰, E¹⁰ and at the other end has an adjustable weight E¹¹ for balancing the lever. One of these cups is electrically connected to the switch arm C² and the other to the positive pole. The up and down movements of the capsule rod D² energize and de-energize the electro-magnets E⁵, E⁶, and the bridge piece E⁹ thus operates to bring into the heating circuit the section of the resistance A between the switch arms C, C² or to short-circuit this section as required. This form of relay may be replaced by any other form suitable for the purpose.

The heating element A may be arranged in the flue pipe of an incubator, it may be clamped to the water tank of an incubator or it may be arranged for fixing inside a hot air incubator or other chamber. In any case the aforesaid switch arms, contact studs and make and break contact member are arranged outside the incubator and are preferably enclosed in a box as aforesaid from which projects a handle or knob for operating the switch arms.

What I claim and desire to secure by Letters Patent of the United States is:—

1. Electrical heating apparatus comprising in combination a resistance serving as the heating element, tappings at different points of said resistance, contact members, an adjustable switch member associated with said contact members, leads connecting said contact members to said tapping points, a lead connecting said switch member to one of the poles of the electric supply, another lead connecting one end of said resistance to the other pole of the electric supply, a second switch member bearing a contact member appertaining to a resistance tapping below the one connected to the contact member on which the other switch member is for the time being resting, a temperature controlled element and a make and break device operated by said element for automatically connecting said second switch member to the pole to which the other switch member is connected, when the temperature falls below a certain level and for breaking the connection when the temperature rises above another level.

2. Electrical heating apparatus comprising in combination a resistance serving as the heating element, tappings at different points of said resistance, contact members, an adjustable switch member associated with said contact members, leads connecting said contact members to said tapping points, a lead connecting said switch member to one of the poles of the electric supply, another lead connecting one end of said resistance to the other pole of the electric supply, a second switch member bearing on a contact member appertaining to a resistance tapping below the one connected to the contact member on which the other switch member is for the time being resting, a temperature controlled element, a make and break device comprising a spring contact member operated by said element and an associated contact piece, means for electrically connecting said spring contact member to one of the switch members and means for electrically connecting said contact piece to the other switch member.

3. Electrical heating apparatus comprising in combination a resistance serving as the heating element, tappings at different points of said resistance, contact members, a manually adjustable switch member associated with said contact members, leads connecting said contact members to said tapping points, a lead connecting said switch member to one of the poles of the electric supply, another lead connecting one end of said resistance to the other pole of the electric supply, means for automatically varying the amount of resistance in circuit in accordance with the temperature of a chamber with which the heating element is associated, an extra heating resistance, and means for bringing said extra resistance into operation when the switch member is in the minimum resistance position.

4. Electrical heating apparatus comprising in combination a resistance serving as the heating element, tappings at different points of said resistance, contact members, a manually adjustable switch member associated with said contact members, leads connecting said contact members to said tapping points, a lead connecting said switch member to one of the poles of the electric supply, another lead connecting one end of said resistance to the other pole of the electric supply, a temperature controlled element, a make and break device operated by said element for automatically varying the amount of resistance in circuit, an extra heating resistance, and means for bringing said extra resistance into operation when the switch member is in the minimum resistance position.

5. Electrical heating apparatus comprising in combination with the elements claimed in claim 1, an extra heating resistance and means for bringing said extra resistance into operation when the switch members are in the minimum resistance position.

6. Electrical heating apparatus comprising in combination with the elements claimed in claim 2, an extra heating resistance and means for bringing said extra resistance into operation when the switch members are in the minimum resistance position.

GEORGE THOMAS CHURCH.